(12) United States Patent
Scheibel

(10) Patent No.: US 8,397,507 B2
(45) Date of Patent: Mar. 19, 2013

(54) ACTIVE BRAKE BOOSTER SYSTEM

(75) Inventor: Hans-Joerg Lothar Scheibel, Lake Orion, MI (US)

(73) Assignee: Continental Automoitve Systems, Inc., Auburn Hills, MI (US)

( * ) Notice: Subject to any disclaimer, the term of this patent is extended or adjusted under 35 U.S.C. 154(b) by 982 days.

(21) Appl. No.: 12/463,671

(22) Filed: May 11, 2009

(65) Prior Publication Data

US 2010/0282069 A1 Nov. 11, 2010

(51) Int. Cl.
*F16D 31/02* (2006.01)
(52) U.S. Cl. ........................................ 60/698
(58) Field of Classification Search ............ 60/397
See application file for complete search history.

(56) References Cited

U.S. PATENT DOCUMENTS 4,224,791 A * 9/1980 Ostwald ........................ 60/397
6,244,676 B1 * 6/2001 Watanabe et al. ............ 60/397

* cited by examiner

*Primary Examiner* — F. Daniel Lopez

(57) ABSTRACT

A brake booster system for a motor vehicle of a type having an internal combustion engine without a conventional throttle-type valve in an intake manifold for engine output control. In accordance with the present invention, a throttleless-type IC engine of the above described type is modified to include a valve which can periodically close or obstruct the path of intake air to the IC engine to generate intake manifold vacuum to provide a needed pressure differential for brake booster operation. The system includes a pressure transducer which controls operation of the valve to provide the desired control of engine brake booster vacuum.

20 Claims, 3 Drawing Sheets

ACTIVE BRAKE BOOSTER SYSTEM

FIELD OF THE INVENTION

This invention relates to a motor vehicle braking system and particularly to a system for providing a vacuum operated brake booster in applications for internal combustion engines with throttleless air intake manifolds.

BACKGROUND OF THE INVENTION

For many decades, conventional motor vehicles have been provided with vacuum boosted wheel braking systems. Before power assisted brakes were used, the brake pedal force applied by the driver acted directly on a master cylinder piston which provided hydraulic pressure applied to brake drum cylinders or disc brake calipers. Many decades ago, a system was developed for providing additional force to apply hydraulic brakes which enabled the operator to use reduced pedal pressure, yet provide strong braking performance. By far, the most commonly used systems today are vacuum booster types. Conventional internal combustion (IC) engines produce a low pressure (relative to atmospheric pressure) in the combustion air intake manifold since a throttle plate in the air induction system restricts air intake flow drawn by the engine. The throttle plate is typically part of a carburetor in older engine designs, or in a so-called throttle body in more modern engines with fuel injection systems. The position of the throttle plate is a primary input in controlling engine power output. The pumping effect of the engine cylinders draw air across the throttle plate which results in a vacuum condition in the intake manifold. In other words, a pressure less than atmospheric is created. A large diaphragm in the booster unit is mechanically connected with the brake's master cylinder piston. The vacuum air pressure is applied to both sides of the diaphragm. When the brake pedal is depressed by the driver, atmospheric air is allowed to enter the booster cavity on one side of the diaphragm. This creates a pressure differential across the diaphragm which results in a net apply force acting on the master cylinder piston in a manner proportional to the actuation force applied to the brake pedal.

The conventional vacuum assisted power brake system has provided outstanding performance. In more recent designs of internal combustion engines, the throttle butterfly valve is removed from the air intake manifold of the combustion air induction system. These engines have their power output controlled by other means, such as through cylinder head valve operation control or by modifying the charge induced by a fuel injection system. Since the throttle butterfly valve is absent in these designs, intake manifold vacuum adequate for brake booster operation is also not available. Accordingly, these engine designs do not provide a convenient source of vacuum pressure for a booster unit used in providing power assist for the braking system.

Various solutions have been considered to address the need for maintaining power assisted braking performance for use with engines using a so-called throttleless-type air intake manifolds. One approach is to provide an external vacuum pump which is belt driven by an engine crankshaft pulley or driven by an electric motor powered from the vehicle's electrical power buss. Such systems require additional components which add cost and complexity to the vehicle.

The present invention seeks to address the shortcomings of the prior art enabling a modified vacuum booster system to be used with an IC engine with a throttleless-type air intake manifold.

SUMMARY OF THE INVENTION

In accordance with the present invention, a brake booster system is provided having a valve arrangement in the intake manifold which can completely or partially obstruct combustion air flowing in the air induction system to create intake manifold vacuum for a brake booster. When sufficient vacuum is developed, the valve opens the normal combustion air induction system pathway for normal operation of the engine. The valve system is actuated to restrict airflow as needed to maintain desired levels of brake booster vacuum.

DETAILED DESCRIPTION OF THE DRAWINGS

DETAILED DESCRIPTION OF THE INVENTION

Figure 1:
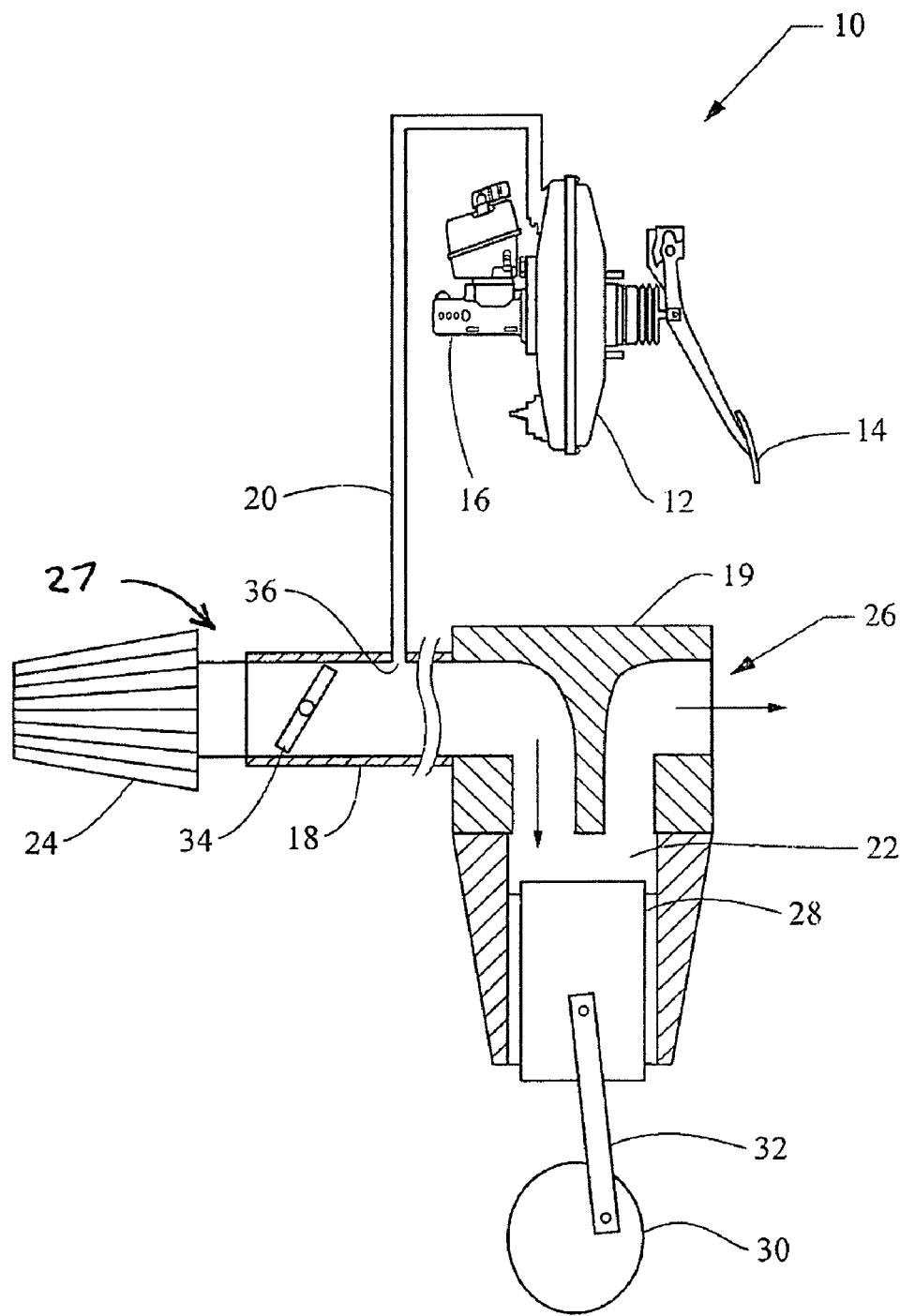
FIG. 1 illustrates a vacuum brake booster system in accordance with the prior art.

FIG. 1 illustrates a brake booster system in accordance with the prior art generally designated by reference number 10. The brake booster system includes vacuum booster unit 12 of conventional construction. Vacuum booster unit 12 is shown connected with actuating brake pedal 14 and master cylinder 16 in accordance with well known conventional designs. Vacuum booster unit 12 applies actuation force on an internal piston (not shown) within master cylinder 16 to generate hydraulic pressure for wheel brake actuation. Added actuation force is produced by a pressure differential across an internal diaphragm (not shown) in vacuum booster unit 12. The pressure differential across the brake booster diaphragm produces a net force for assisting in brake actuation.

Vacuum booster unit 12 is connected with the vehicle's intake manifold 18 by vacuum hose 20 (which could also be any line, pipe, or passage allowing air flow). Intake manifold 18 is shown diagrammatically in the figures as providing a flow passage for combustion air or a mixture of air and fuel, and is shown connected to cylinder head 19. The combustion air flows through an air cleaner 24 and other components of the air induction system 27 upstream of the air intake manifold 18. In accordance with conventional IC engine technology, the flow of the air or air-fuel mixture is introduced into combustion chamber 22 via poppet valves or other types of engine valves (not shown). Similarly, a set of valves is used to open a passage from combustion chamber 22 through cylinder head 19 to an exhaust manifold. The IC engine 26 is shown diagrammatically as including a reciprocating piston 28, crankshaft 30, and connecting rod 32. Details of IC engine 26, intake manifold 18, and the exhaust manifold are omitted here since they are of conventional well-known construction and their particular features are not uniquely adapted to the present invention.

In the brake booster system 10 in accordance with the prior art, vacuum hose 20 is connected with a vacuum port 36 located between the engine's cylinder head 19 and a butterfly-type throttle valve 34. Valve 34 controls the mass flow rate of air or air/fuel mixture introduced into the engine. In IC engines with so-called port or intake manifold injection, fuel is introduced into the combustion air after it passes across butterfly valve 34. In older designs, butterfly valve 34 was part of a carburetor and fuel was added to the mixture at a venturi adjacent to the position of valve 34.

During operation of IC engine 26, vacuum is created in intake manifold 18 as the airflow is restricted in flowing across valve 34 and is being drawn into IC engine 26 via reciprocating of pistons 28. Vacuum levels of about 0.7 bars are typical in intake manifold 18 (at idle).

As stated previously, brake booster system 10 of the prior art designs operate satisfactorily, but relies on the presence of butterfly valve 34 to maintain intake manifold vacuum for powering vacuum booster unit 12.

Figure 2:
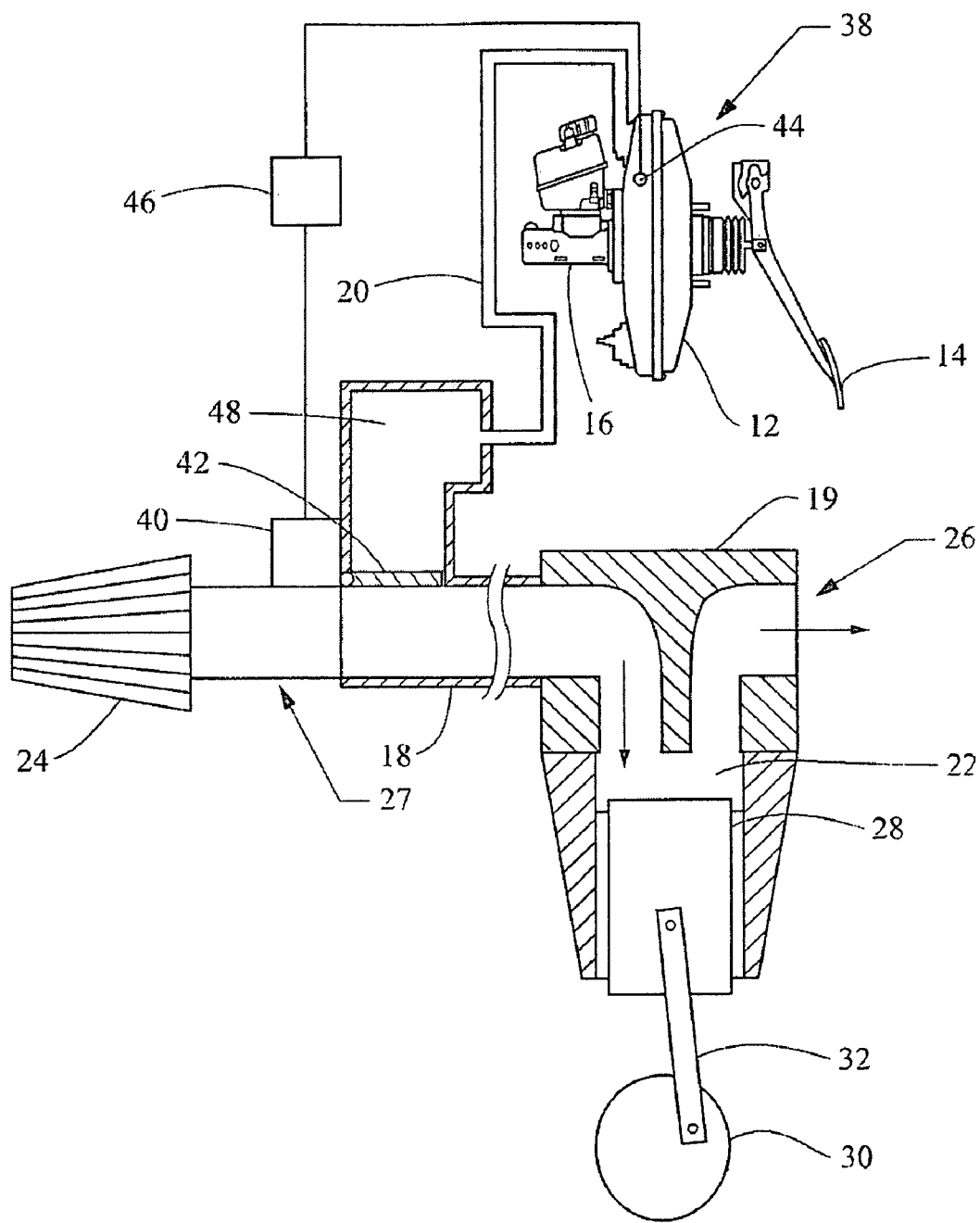
FIG. 2 illustrates an active brake booster system in accordance with this invention, showing the booster in the vacuum hold mode.
Figure 3:
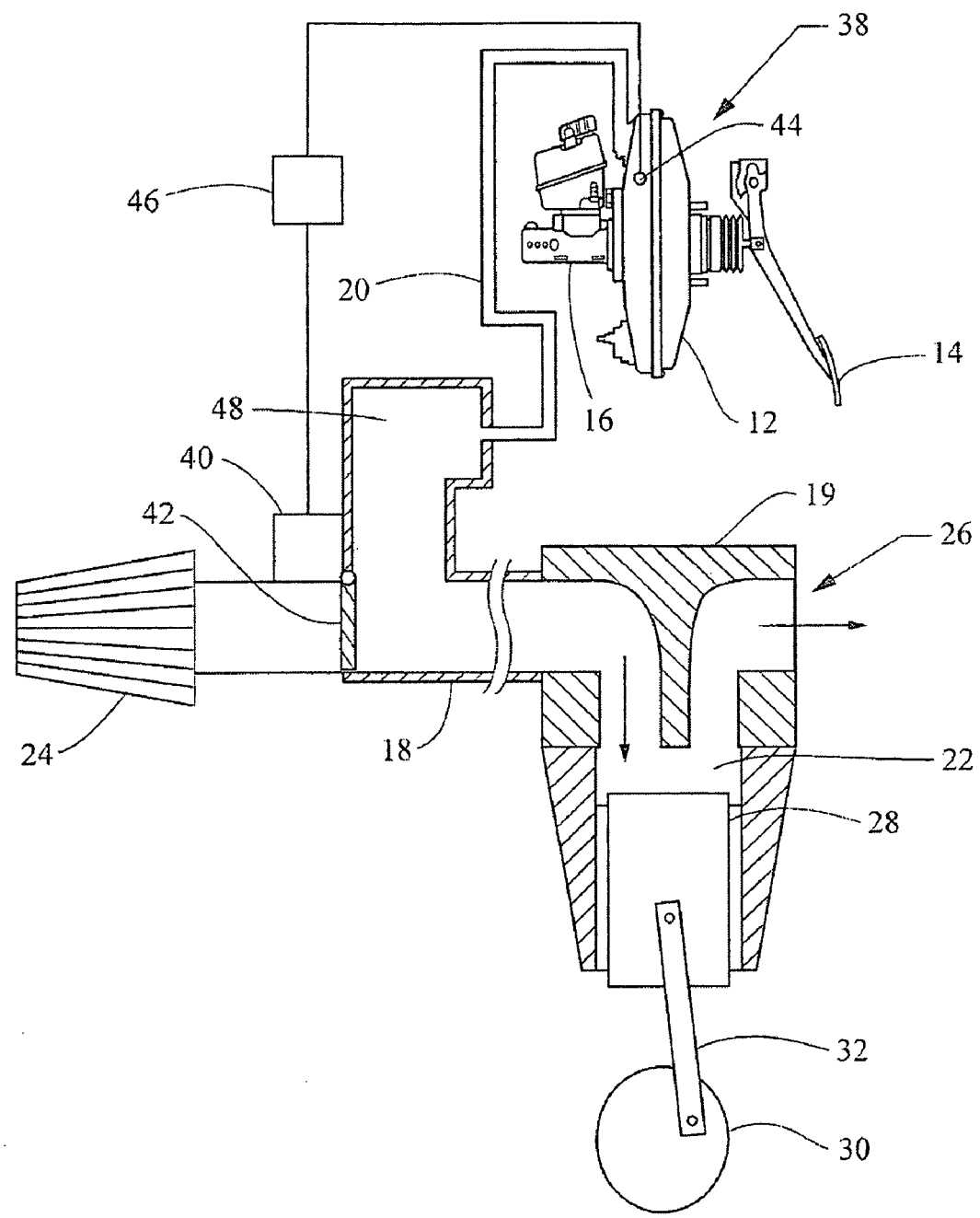
FIG. 3 is an active brake booster system in accordance with this invention showing the booster in an evacuation mode.

Active brake booster system 38 in accordance with the present invention is illustrated in FIGS. 2 and 3. Many of the components of active brake booster system 38 are identical to those described previously in connection with brake booster system 10, and are identified by like reference numbers. As illustrated, active brake booster system 38 includes vacuum booster unit 12, brake pedal 14, master cylinder 16, air induction system 27, and vacuum hose 20. Moreover, the system is used with an IC engine 26 having combustion chamber 22, intake manifold 18, piston 28, crankshaft 30, and connecting rod 32.

The system illustrated in FIGS. 2 and 3 differs from that shown in FIG. 1 in part by the elimination of butterfly valve 34. The engine configuration shown in FIGS. 2 and 3 provides control of the engine's power output through other means. Active brake booster system 38 includes actuator 40 which controls the position of intake manifold valve 42. Valve 42 is shown moved between two extreme positions. FIG. 2 illustrates the valve 42 in a booster vacuum hold mode in which it does not obstruct the flow of intake air through intake manifold 18 to engine 26. This operating condition corresponds with a state where sufficient vacuum exists in vacuum booster unit 12. When brake booster vacuum levels fall (i.e. pressure increases toward ambient), a vacuum pressure transducer 44, which may be located within vacuum booster unit 12 or within vacuum hose 20, indicates that vacuum levels must be increased (i.e. a lower pressure is needed). A signal from transducer 44 is sent to controller 46, which controls operation of valve 42 through control signals to actuator 40. When valve 42 is in the position shown in FIG. 2, it blocks the airflow path between intake manifold 18 and booster 12. This prevents higher pressure air from filling brake booster 12, thus maintaining the desired vacuum.

In a condition where vacuum is needed for booster 12, as indicated by a signal from pressure transducer 44 indicating air pressure above a predetermined level (high pressure limit), actuator 40 moves intake manifold valve 42 to a position which partially or completely closes the path of combustion intake air through the air induction system as shown in FIG. 3. In that case, the pumping effect of the engine draws down the intake manifold pressure by evacuating intake manifold 18, vacuum hose 20, and vacuum booster unit 12. FIGS. 2 and 3 show valve chamber 48 connected with vacuum hose 20. However, alternatively, hose 20 could be directly connected with an intake manifold port downstream from valve 48. When a desired level of vacuum (i.e. low pressure) is reached, as indicated by a signal from pressure transducer 44 indicating air pressure below a predetermined level (low pressure limit), the system may again return to the "vacuum hold" configuration shown in FIG. 2.

Due to the strong pumping effect of a typical IC engine, sufficient pressure evacuation can occur in an extremely short period of time, e.g. less than one second and preferably less than 400 ms. Thus, intake manifold valve 42 may be actuated periodically as needed for brief instances needed to provide the desired booster vacuum pressure. Other operating approaches can be used, such as the actuation of valve 42 to partially obstruct the airflow path through the air induction system 27 as needed to produce the desired low pressure in the booster unit 12. It should be noted that valve 42 is actuated based on the control of vacuum pressure for booster 12, and is not controlled on the basis of driver input for power control of the engine.

While the above description constitutes the preferred embodiment of the present invention, it will be appreciated that the invention is susceptible to modification, variation, and change without departing from the proper scope and fair meaning of the accompanying claims.

The invention claimed is:

1. A brake booster system for a motor vehicle of a type having an internal combustion engine with a throttle-less intake manifold not having a throttle valve for controlling output of the engine, an air induction system, and a vacuum actuated brake booster, comprising:

a vacuum pressure transducer for measuring the pressure in the brake booster and producing a vacuum pressure signal, a hose means for connecting the brake booster with the intake manifold, a valve means moveable between a first position for at least partially blocking airflow through the air induction system thereby developing vacuum pressure in the intake manifold, and a second position in which the valve means does not obstruct the airflow path through the air induction system, the valve means further closing a flow path between the intake manifold and the brake booster when the valve means is in the second position thereby maintaining vacuum pressure in the brake booster, an actuator for controlling the position of the valve means in response to the pressure signals to enable desired vacuum pressure to be maintained in the brake booster, and a controller for receiving the vacuum pressure signal and providing a control signal for the actuator.

2. A brake booster system in accordance with claim 1 wherein the valve means partially obstructs airflow from the air induction system in the first position.

3. A brake booster system in accordance with claim 1 wherein the controller controls the actuator to move the valve means to the first position when the air pressure in the brake booster is above a first predetermined level, and moving the valve means to the second position when the air pressure in the brake booster is below a second predetermined level.

4. A brake booster system in accordance with claim 1 wherein the controller actuates the valve means to move to the first position for a period of time of less than one second.

5. A brake booster system in accordance with claim 1 wherein the controller actuates the valve means to move to the first position for a period of time of less than 400 ms.

6. A method of operating a brake booster system for a motor vehicle of a type having an internal combustion engine with a throttle-less intake manifold not having a throttle valve for controlling output of the engine, an air induction system, and a vacuum actuated brake booster, comprising:

providing a vacuum pressure transducer for measuring the pressure in the brake booster and producing a vacuum pressure signal, providing a hose means for connecting the brake booster with the intake manifold, providing a valve means moving between a first position for at least partially blocking airflow through the air induction system thereby developing vacuum pressure in the intake manifold, and a second position in which the valve means does not obstruct the airflow path through the air induction system, the valve means further closing a flow path between the intake manifold and the brake booster when the valve means is in the second position thereby maintaining vacuum pressure in the brake booster, providing an actuator for controlling the valve means in response to the pressure signals to enable desired vacuum pressure to be maintained in the brake booster, and receiving the vacuum pressure signal and providing a control signal for the actuator causing the valve means to move to the first position when the pressure in the brake booster is above a first predetermined level, and causing the valve means to move to the second position when the pressure in the brake booster is below a second predetermined level.

7. A method of operating a brake booster system in accordance with claim 6 wherein the valve means partially obstructing airflow from the air induction system in the first position.

8. A method of operating a brake booster system in accordance with claim 6 further comprising maintaining the valve means in the first position for a period of time less than one second.

9. A method of operating a brake booster system in accordance with claim 7 further comprising maintaining the valve means in the first position for a period of time less than 400 ms.

10. A brake booster system for a motor vehicle of a type having an internal combustion engine with a throttle-less intake manifold not having a throttle valve for controlling output of the engine, an air induction system, and a vacuum actuated brake booster, comprising:

a vacuum pressure transducer for measuring the pressure in the brake booster and producing a vacuum pressure signal, a hose means connecting the brake booster with the intake manifold, a valve means moveable between a first position for fully obstructing airflow through the air induction system thereby developing vacuum pressure in the intake manifold, and a second position in which the valve means does not obstruct the airflow path through the air induction system, an actuator for controlling the position of the valve means in response to the pressure signals to enable desired vacuum pressure to be maintained in the brake booster, and a controller for receiving the vacuum pressure signal and providing a control signal for the actuator.

11. A brake booster system in accordance with claim 10 further comprising the valve means closing a flow path between the intake manifold and the brake booster when the valve means is in the second position thereby maintaining vacuum pressure in the brake booster.

12. A brake booster system in accordance with claim 10 wherein the controller controls the actuator to move the valve means to the first position when the air pressure in the brake booster is above a first predetermined level, and moving the valve means to the second position when the air pressure in the brake booster is below a second predetermined level.

13. A brake booster system in accordance with claim 10 wherein the controller actuates the valve means to move to the first position for a period of time of less than one second.

14. A brake booster system in accordance with claim 10 wherein the controller actuates the valve means to move to the first position for a period of time of less than 400 ms.

15. A method of operating a brake booster system for a motor vehicle of a type having an internal combustion engine with a throttle-less intake manifold not having a throttle valve for controlling output of the engine, an air induction system, and a vacuum actuated brake booster, comprising:

providing a vacuum pressure transducer for measuring the pressure in the brake booster and producing a vacuum pressure signal, providing a hose means for connecting the brake booster with the intake manifold, providing a valve means moving between a first position fully obstructing airflow path from the air induction system in the first position thereby developing vacuum pressure in the intake manifold, and a second position in which the valve means does not obstruct the airflow path through the air induction system, providing an actuator for controlling the valve means in response to the pressure signals to enable desired vacuum pressure to be maintained in the brake booster, and receiving the vacuum pressure signal and providing a control signal for the actuator causing the valve means to move to the first position when the pressure in the brake booster is above a first predetermined level, and causing the valve means to move to the second position when the pressure in the brake booster is below a second predetermined level.

16. A method of operating a brake booster system in accordance with claim 15 further comprising the valve means closing a flow path between the intake manifold and the brake booster when the valve means is in the second position thereby maintaining vacuum pressure in the brake booster.

17. A method of operating a brake booster system in accordance with claim 15 further comprising maintaining the valve means in the first position for a period of time less than one second.

18. A method of operating a brake booster system in accordance with claim 15 further comprising maintaining the valve means in the first position for a period of time less than 400 ms.

19. A brake booster system in accordance with claim 1 further comprising the hose means forming at least a part of the flow path.

20. A brake booster system in accordance with claim 6 further comprising the hose means forming at least a part of the flow path.

* * * * *